(12) United States Patent
Kish et al.

(10) Patent No.: US 6,726,432 B2
(45) Date of Patent: Apr. 27, 2004

(54) LOW-PROFILE VEHICLE RESTRAINT

(75) Inventors: John Kish, Grafton, WI (US); Timothy C. Cotton, Milwaukee, WI (US); Ryan J. Kleckner, Grafton, WI (US); Kurt Lessard, South Milwaukee, WI (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 0 days.

(21) Appl. No.: 09/951,649

(22) Filed: Sep. 13, 2001

(65) Prior Publication Data

US 2003/0049108 A1 Mar. 13, 2003

(51) Int. Cl.[7] .............................................. B65G 67/02
(52) U.S. Cl. ........................................ 414/401; 414/809
(58) Field of Search .................................. 414/396, 401, 414/584, 809

(56) References Cited

U.S. PATENT DOCUMENTS

| | | | | |
|---|---|---|---|---|
| 4,553,895 A | | 11/1985 | Ellis | 414/401 |
| 4,605,353 A | | 8/1986 | Hahn | 414/401 |
| 4,634,334 A | | 1/1987 | Hahn | 414/401 |
| 4,648,781 A | * | 3/1987 | Sikora | 414/401 |
| 4,664,582 A | | 5/1987 | Edmeads | 414/401 |
| 4,728,242 A | * | 3/1988 | Erlandsson | 414/401 |
| RE33,154 E | | 1/1990 | Hahn | 414/401 |
| 5,071,306 A | * | 12/1991 | Alexander | 414/401 |
| 5,683,219 A | * | 11/1997 | Gilles et al. | 414/401 |
| 6,113,337 A | * | 9/2000 | Massey | 414/401 |

* cited by examiner

*Primary Examiner*—James W. Keenan
(74) *Attorney, Agent, or Firm*—Marshall, Gerstein & Borun LLP

(57) ABSTRACT

A vehicle restraint includes a restraining member that rises to an operative position and lowers to a stored position to respectively engage and release an ICC bar of a truck parked at a loading dock. In moving to the lowered stored position, the restraining member also rotates off to its side, so as not to obstruct snow removal equipment or incoming vehicles having an especially low ICC bar or low ground clearance. In some embodiments, rotation of the restraining member is achieved by various actuators that apply a generally uniform torque. A resilient member, moves the restraining member upward to engage the ICC bar, and allows for vertical movement of the truck as it is being loaded or unloaded. Opposing the upward urging of the resilient member, a drive unit forcibly moves the restraining member downward when the truck is ready to be released.

18 Claims, 9 Drawing Sheets

LOW-PROFILE VEHICLE RESTRAINT

BACKGROUND OF THE INVENTION

1. Field of the Invention

The subject invention generally pertains to a vehicle restraint and more specifically to one that moves to a low-profile stored position.

2. Description of Related Art

When a truck backs up against a dock for loading or unloading the truck, a generally safe practice is to restrain the truck to prevent it from accidentally pulling away from the dock. This is often accomplished by a hook-style vehicle restraint that engages what is known as an ICC bar or a Rear Impact Guard (RIG). An ICC bar or RIG is basically a bumper in the form of a horizontal bar or beam that runs along the rear of a truck, below the truck bed. Its primary purpose is to prevent an automobile from under-riding the truck in a rear-end collision. A conventional hook-style restraint includes a hook that moves between a lowered stored position and a raised operative position. The lowered stored position allows the ICC bar to pass over the hook as the truck backs up against the dock. The hook then rises to its operative position where the hook engages the bar to restrain the vehicle.

With many hook-style vehicle restraints, a hook's stored position can create several problems. First, a stored hook protruding out from the face of the dock can be an obstacle that prevents smaller vehicles or those with low ground clearance from getting close enough to the dock for effective loading and unloading. For example, when a protruding hook forces a pick-up truck or van to park a short distance away from the dock, the protruding hook can be a tripping hazard for anyone on the driveway trying to load or unload the vehicle. Second, in some cases, a truck or trailer's ICC bar is too low to clear the top of a stored hook. This problem is becoming more prevalent, as newer vehicles are being built with lower beds. And third, a stored hook protruding from the face of a dock can obstruct snow removal equipment.

To address some of these problems, U.S. Pat. No. 4,664,582 discloses a truck restraint with a hook that not only moves vertically between a raised operative position and a lowered stored position, but also rotates about a vertical axis. The rotation allows the hook to alternately swing between being perpendicular to the dock face or generally flat up against it. The '582 restraint, however, has a stored height that may still interfere with some vehicles with a relatively low ICC bar. Although the hook, in its stored position, might be below the bar initially, the hook has to raise some in order for the hook to rotate outward away from the dock face. The initial ascent of the hook to effect the rotation may place the hook above the bar before the hook is able to swing underneath it. The initial lift can be minimized by reducing the steepness of the inclined edge that causes the hook to rotate, but that increases the upward force required to lift the hook. And increasing the upward force can lead to a situation that can damage the ICC bar. For example, once the hook rotates outward and off the inclined edge, the sustained high upward force is free to simply accelerate the hook upward at an speed until the hook strikes the ICC bar. A sufficiently high impact could damage the bar. Moreover, a sufficiently high upward force on the hook may limit the vehicle from normal vertical float. Vertical float of a couple of inches or more is common and is caused by varying cargo weight and the weight of a forklift driving onto the bed of the vehicle as it is being loaded or unloaded. If the hook provides no give to slightly descend as the truck is loaded, the added weight could crush the ICC bar between the bed of the vehicle and the hook, as ICC bars are not normally intended to support the weight of the truck's cargo.

Some vehicle restraints have a rotational hook, as disclosed in U.S. Pat. Nos. 4,553,895; 4,605,353; and Re33,154. With these restraints, however, the hook is rotated manually. Also, the hooks of the patented restraints are lowered onto an ICC bar, which means the vehicle must have clearance above its ICC bar in order for the hook to swing into position. Not all vehicles provide such clearance.

Another vehicle restraint, disclosed in U.S. Pat. No. 4,634,334, includes a hook that is power-rotated between a stored position and an operative position. However, except for hook's rotation, the restraint does not move vertically to accommodate ICC bars of various heights.

SUMMARY OF THE INVENTION

In order to provide a low-impact vehicle restraint with a low-profile stored position, a restraint is provided with a hook that moves both vertically and rotationally between a lowered stored position and a raised operative position. In the raised operative position the hook is adapted to engage an ICC bar of a vehicle to limit the vehicle's movement away from a loading dock. In the lowered stored position, the hook's position allows the vehicle to back up against the dock. The hook's rotation is such that it has a minimal affect on the restraint's effective range, wherein the range is defined by those elevations at which an ICC bar can be effectively restrained by the hook. The restraint includes a resilient member that provides upward movement of the hook while allowing some downward movement of the vehicle being restrained.

In some embodiments, the hook rotates about an axis that is generally perpendicular to the dock face so that the hook in its lowered stored position lies rather low to the ground to accommodate especially low ICC bars or vehicles with relatively low ground clearance.

In some embodiments, the rotation of the hook is completed before the hook begins rising, thus being able to accommodate relatively low ICC bars.

In some embodiments, the force that rotates the hook is applied at a generally uniform distance from the hook's rotational axis to avoid a peak force or peak torque that might slam the hook into position.

In some embodiments, the force that rotates the hook is applied at a generally uniform distance from the hook's rotational axis so that when the force is brought on by vertical movement of the hook, peak vertical forces that may tend to slam the hook up against the underside of the ICC bar are avoided.

In some embodiments, the force that rotates the hook is applied in a direction generally perpendicular to the hook's rotational axis to keep the total force less than what would otherwise be required if the force were just a component of a greater force applied at an angle other than ninety degrees to the rotational axis.

In some embodiments, a resilient member, such as a spring, provides upward movement of the hook to engage an ICC bar of a vehicle while allowing some downward movement of the vehicle once it is restrained.

In some embodiments, a resilient member, such as a spring, avoids damaging an ICC bar of a vehicle by limiting the upward thrust that a restraining member can exert against the bar.

DESCRIPTION OF THE PREFERRED EMBODIMENT

Figures 1, 2:
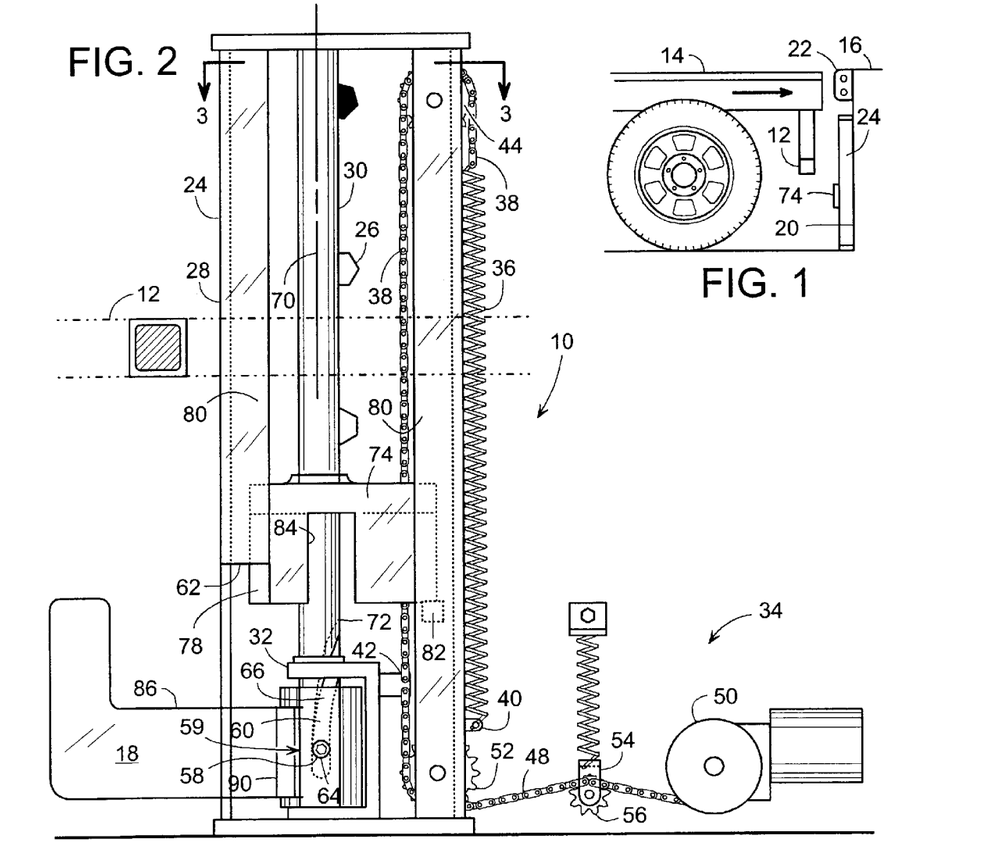
FIG. 1 is a side view of a vehicle backing into a loading dock that includes a vehicle restraint in its lowered stored position.
FIG. 2 is a front view of a vehicle restraint in its lowered stored position.
Figure 3:
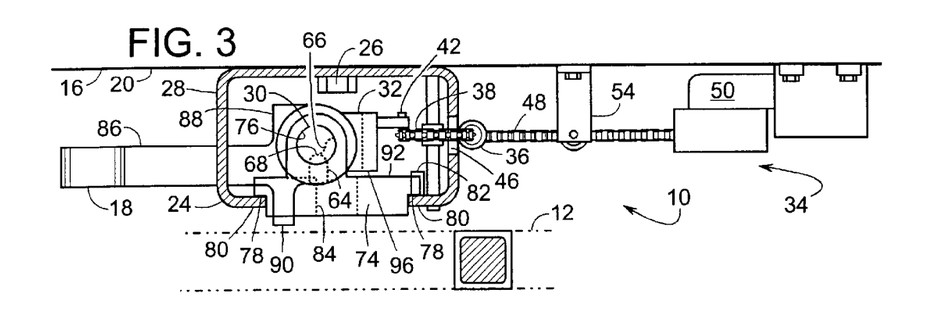
FIG. 3 is a top cross-sectional view taken along line 3—3 of FIG. 2.
Figures 4, 6:
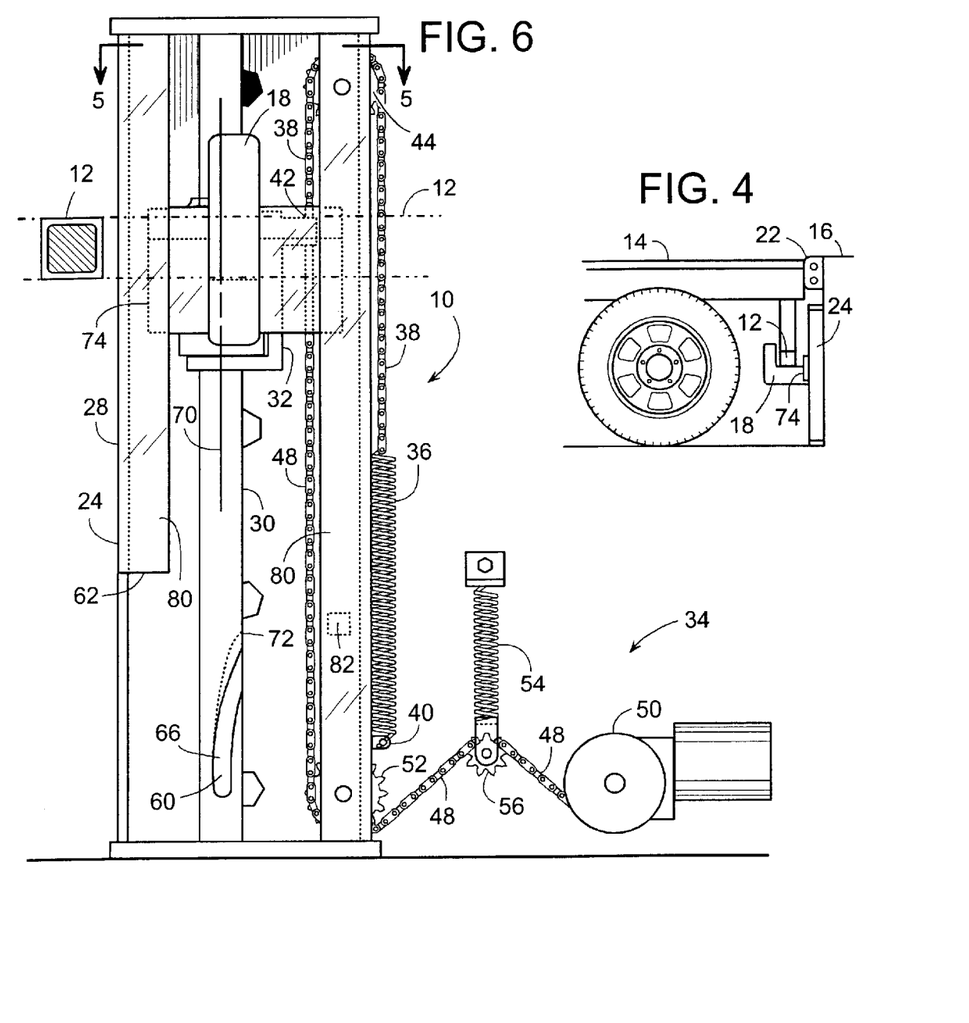
FIG. 4 is the same as FIG. 1, but with the vehicle restraint in its raised operative position.
FIG. 6 is the same as FIG. 2, but with the vehicle restraint in its raised operative position.
Figure 5:
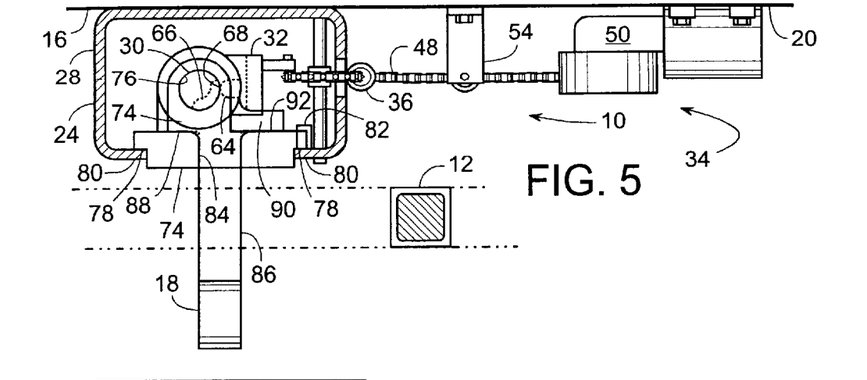
FIG. 5 is a top cross-sectional view taken along line 5—5 of FIG. 6.

A vehicle restraint 10 adapted to engage a vehicle's ICC bar 12 to prevent a vehicle 14 from accidentally pulling away from a loading dock 16 is shown in FIGS. 1–6. To alternately restrain and release vehicle 14, restraint 10 includes a restraining member 18 that moves between a lowered stored position (FIGS. 1–3) and a raised operative position (FIGS. 4–6). In moving to the stored position, restraining member 18 not only descends but also rotates out of the way to allow vehicle 14, such as a track or trailer, to back up against dock 16 or drive away without interference from member 18. When vehicle 14 parks up against the generally vertical dock face 20 or against dock bumpers 22, restraining member 18 rotates and rises to its operative position to engage a portion of bar 12, which prevents vehicle 14 from pulling away.

The vertical movement of restraining member 18 is accomplished by coupling member 18 to a generally vertical track 24, which in turn is attached to dock face 20 by way of fasteners 26. In some embodiments, track 24 includes an outer housing 28 and a central guide rod 30 along which restraining member 18 is free to move. Restraining member 18 is vertically supported, in this exemplary embodiment, by a C-shaped sleeve 32 that slides along rod 30. Sleeve 32 includes upper and lower flanges that slidingly fit around rod 30 and are vertically spaced-apart from each other to inhibit sleeve 32 from cocking or binding on rod 30. A drive unit 34 raises and lowers restraining member 18 by vertically sliding sleeve 32 along rod 30.

To limit the upward thrust that restraining member 18 can exert against an ICC bar, drive unit 34 lifts member 18 by way of a spring 36 or some other resilient member, such as a gas piston/cylinder or a conventional coiled-spring counterbalancer often used for supporting heavy tools. In some embodiments, for example, spring 36 coupled to a roller chain 38 (or a link chain, cable, rope, etc.) is held in tension between a stationary anchor point 40 at one end and another anchor point 42 on sleeve 32. A sprocket 44 at the upper end of track 24 supports chain 38 so that the tension of chain 38 urges sleeve 32 and restraining member 18 upward. An upper notch 46 in housing 28 accommodates sprocket 44 and chain 38.

To control the height to which spring 36 can lift restraining member 18 or to forcibly move restraining member 18 back down to disengage ICC bar 12, drive unit 34 includes another roller chain 48 (or a link chain, cable, rope, etc.) connecting sleeve 32 to a powered take-up device 50. Device 50 is schematically illustrated to represent any device for forcing member 18 downward (either acting directly on member 18 or coupled to it) against the force of spring 36. Examples of device 50 include, but are not limited to a cable or chain winch (possibly similar to those used on a conventional electric or pneumatic jib hoist); a gearmotor driven or otherwise powered roller chain sprocket; or a linear actuator, such as a piston/cylinder. In some embodiments, drive unit 34 includes a lower idler sprocket 52 that changes the direction of pull of chain 48 from vertical to horizontal so that drive unit 34 fits conveniently within the physical constraints of the loading dock area. A lower notch in housing 28 accommodates sprocket 52 and chain 48.

To prevent an ICC bar from accidentally lifting off restraining member 18 as vehicle 14 rises while being unloaded (e.g., a forklift driving off the bed of the truck and onto the dock), drive unit 34 includes a tensioner 54 that keeps chain 48 taut. In some embodiments, tensioner 54 includes a spring-loaded idler sprocket 56 that is able to offset a section of chain 48 when much of the tension of spring 36 is countered by restraining member 18 abutting the underside of bar 12, as best shown in FIG. 6. If bar 12 rises slightly (e.g., up to a couple of inches or more) while take-up device 50 is inactive, there is enough tension in spring 36 to overcome the pull of tensioner 54 and lift restraining member 18 up to maintain contact with bar 12. Tensioner 54 yielding to spring 36 allows sprocket 56 to move to reduce some of the offset of chain 48, which in turn releases some of chain 48 to follow the upward movement of sleeve 32 and restraining member 18.

After completing the loading or unloading of vehicle 14, drive unit 34 pulls sleeve 32 back down, so restraining member 18 descends to release ICC bar 12. To ensure that restraining member 18 is out of the way as much as possible when in its lowered stored position, restraint 10 includes a rotational actuator 59 comprising two interactive guide elements 58 and 60. In some embodiments, one guide element 58 associated with restraining member 18 engages the other guide element 60 which is associated with rod 30. Together, guide elements 58 and 60 rotate member 18 between an outwardly extended position and a position where it lies about parallel to dock face 20. A notched-out section 62 of housing 28 minimizes the extent to which restraining member 18, when in its stored position, extends out from dock face 20. As for the guide elements, some examples of guide elements 58 and 60 include, but are not limited to, a rigid protruding pin; a spring-loaded plunger (also known as a ball plunger); a groove that is inclined, helical or otherwise curved; or an elongated key or edge that is inclined, helical or otherwise curved.

In the embodiment of FIGS. 1–6, for example, guide element 58 is a spring-loaded plunger 64 attached to restraining member 18. And a helical groove 66 or flute on rod 30 serves as guide element 60. A tip 68 of plunger 64 protrudes into groove 66, so that as drive unit 34 allows spring 36 to pull restraining member 18 upward from its stored position, plunger 64 travels along groove 66 to rotate restraining member 18 about a generally vertical axis 70 (longitudinal centerline of rod 30). When rising, restraining member 18 rotates in a counterclockwise direction (as viewed in FIGS. 3 and 6) and rotates clockwise when descending. It should be appreciated by those skilled in the art, that the locations of plunger 64 and groove 66 can be interchanged with plunger 64 being attached to rod 30 with groove 66 being disposed along an inner bore of restraining member 18.

To avoid peak rotational torques that may require excessive vertical thrust to rotate restraining member 18 in a controlled, even motion, the radial distance between axis 70 and tip 68 (when protruding into groove 66) is kept substantially constant.

To avoid having to machine groove 66 along the full vertical length that restraining member 18 or tip 68 travels, tip 68 is able to retract against the urging of a spring within plunger 64. As restraining member 18 continues rising and tip 68 begins moving above an upper end 72 of groove 66, tip 68 is able to retract and ride along the outer diameter of rod 30. In other embodiments where guide element 58 is a rigid protruding pin, groove 66 may need to extend further up along rod 30. Rather than continuing up along a helical path; however, groove 66 would preferably extend in a straight upward direction from end 72. A rigid pin protruding into the straight vertical section of the groove could also serve to keep restraining member 18 extended generally perpendicular to dock face 20 once member 18 rotates out from its lowered stored position.

Once restraining member 18 rotates to its outwardly extended position, another way to keep it generally perpendicular to dock face 20 is to provide restraint 18 with a crossbar 74. In one embodiment, crossbar 74 includes a bore 76 for sliding vertically along rod 30 and includes two edges 78 that slidingly engage two front flanges 80 of outer housing 28. The engagement of edges 78 with flanges 80 prevents crossbar 74 from rotating about rod 30. When restraining member 18 is in its lowered stored position, crossbar 74 rests upon a stationary stop 82 just above member 18. Crossbar 74 also includes a vertical slot 84 into which a shank 86 of restraining member 18 can rise.

Thus, as restraining member 18 rises and rotates out from its stored position, shank 86 slips up into slot 84 to limit member 18 from further rotation relative to rod 30. Continued upward movement of restraining member 18 causes shank 86 to lift crossbar 74 off stop 82. In other words, above stop 82, restraining member 18 and crossbar 74 move as a unit up and down along track 24, while shank 86 protruding through slot 84 keeps member 18 generally perpendicular to dock face 20. When restraining member 18 moves downward toward its stored position, shank 86 deposits crossbar 74 on stop 82 and then slips out from within slot 84 to allow member 18 to rotate back to where it is generally parallel to dock face 20.

To prevent a pullout force (i.e., the force a restrained vehicle exerts on restraining member 18 in an attempt to pull away from dock 16) from permanently bending rod 30, restraining member 18 includes two shoulders 88 and 90 that abut an inside face 92 of crossbar 74. With such an arrangement, a pullout force on restraining member 18 is transmitted though shoulders 88 and 90, crossbar 74 and onto front flanges 80. Thus housing 28 anchored to dock 16 counters the pullout force to protect rod 30, which for mechanical reasons is significantly weaker than housing 80.

To eliminate crossbar 74, if desired, sleeve 32 can be modified so that a front face 96 of sleeve 32 slidingly engages front flanges 80, as opposed to edges 78 engaging flanges 80. Then a rigid pin, as opposed to plunger 64, engages a straight vertical section of a groove in rod 30 to keep restraining member 18 in an extended outright position, as described earlier. In this way, a pullout force on restraining member 18 is transmitted through shank 86, only across a short section of rod 30 (between the upper and lower flanges of modified sleeve 32), through modified sleeve 32, and onto front flanges 80 of housing 28.

Figure 7:
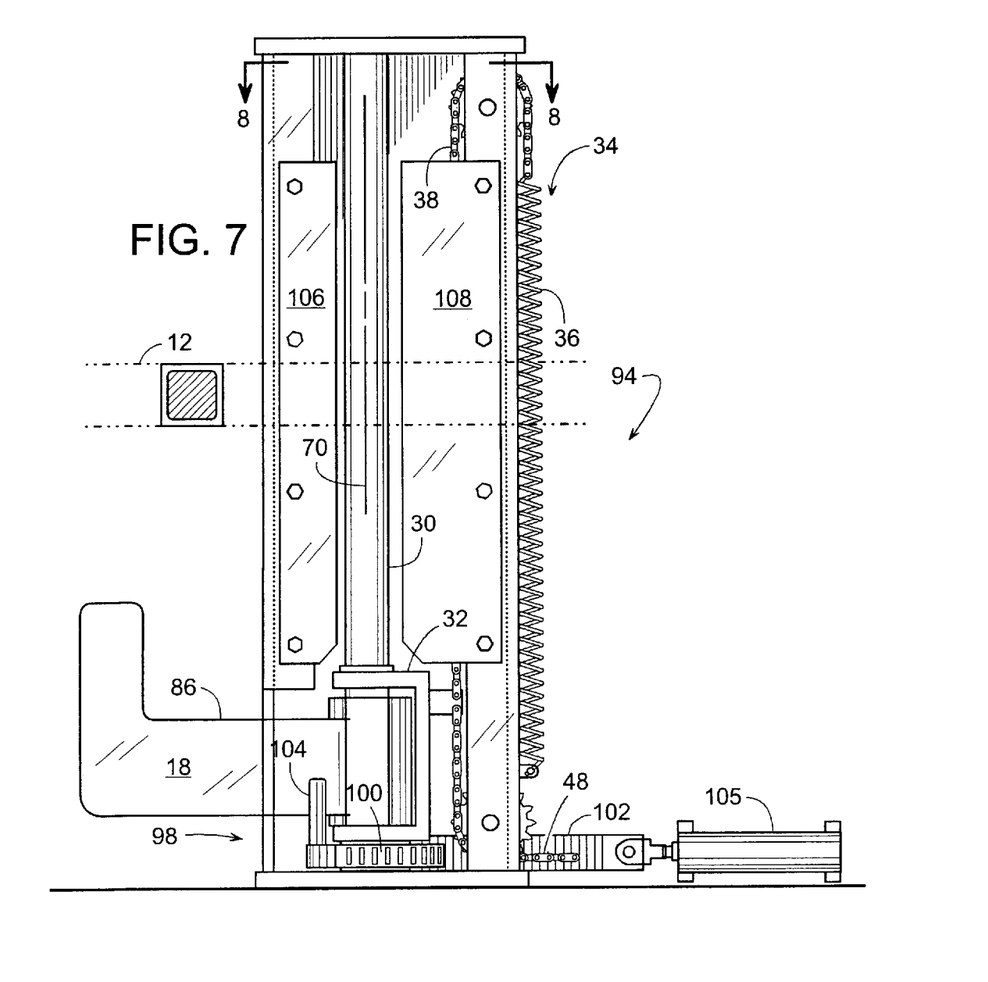
FIG. 7 is a front view of another vehicle restraint in its lowered stored position.
Figure 8:
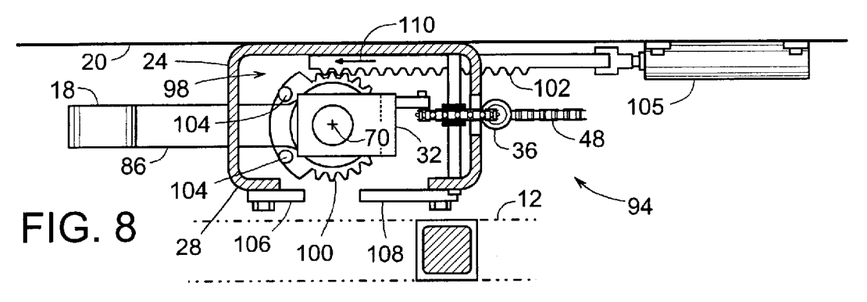
FIG. 8 is a top cross-sectional view taken along line 8—8 of FIG. 7.
Figure 9:
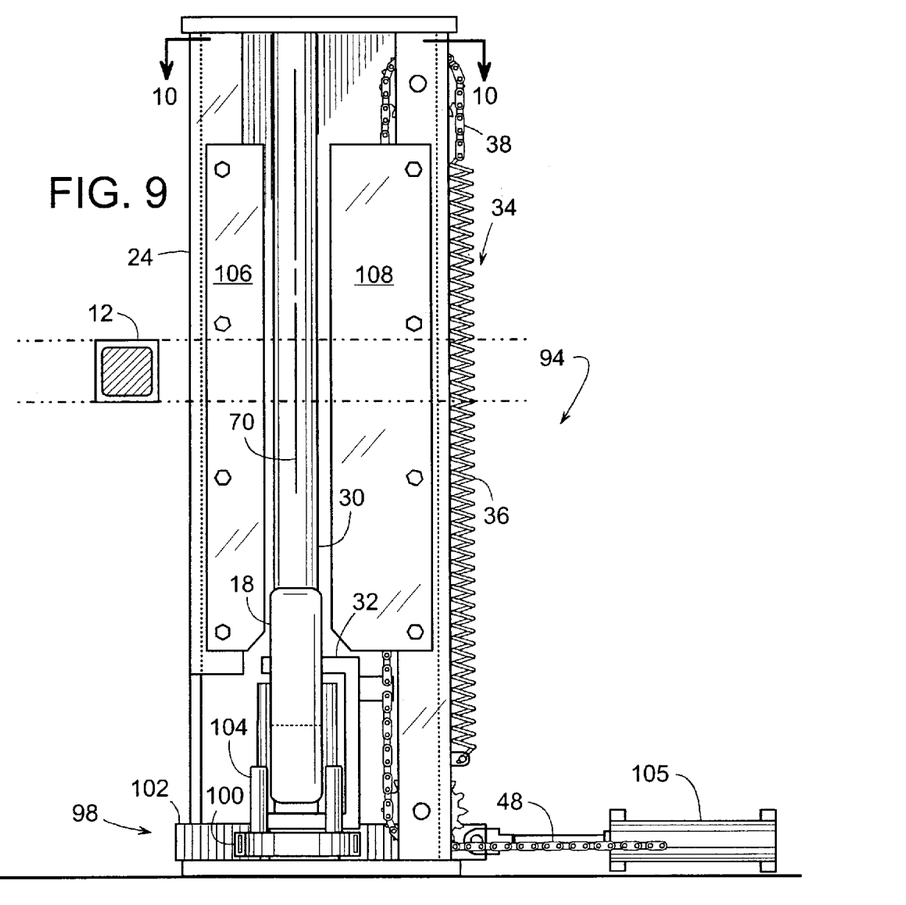
FIG. 9 is the same as FIG. 7, but with the restraint's restraining member rotated outward away from the dock face.
Figure 10:
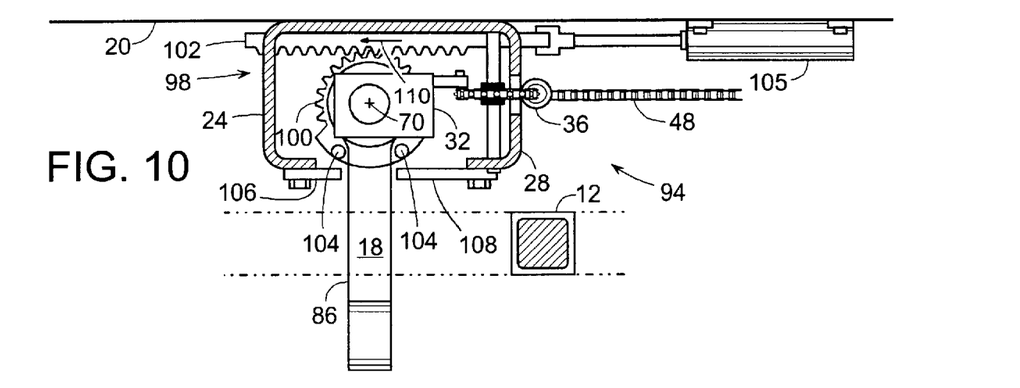
FIG. 10 is a top cross-sectional view taken along line 10—10 of FIG. 9.
Figure 11:
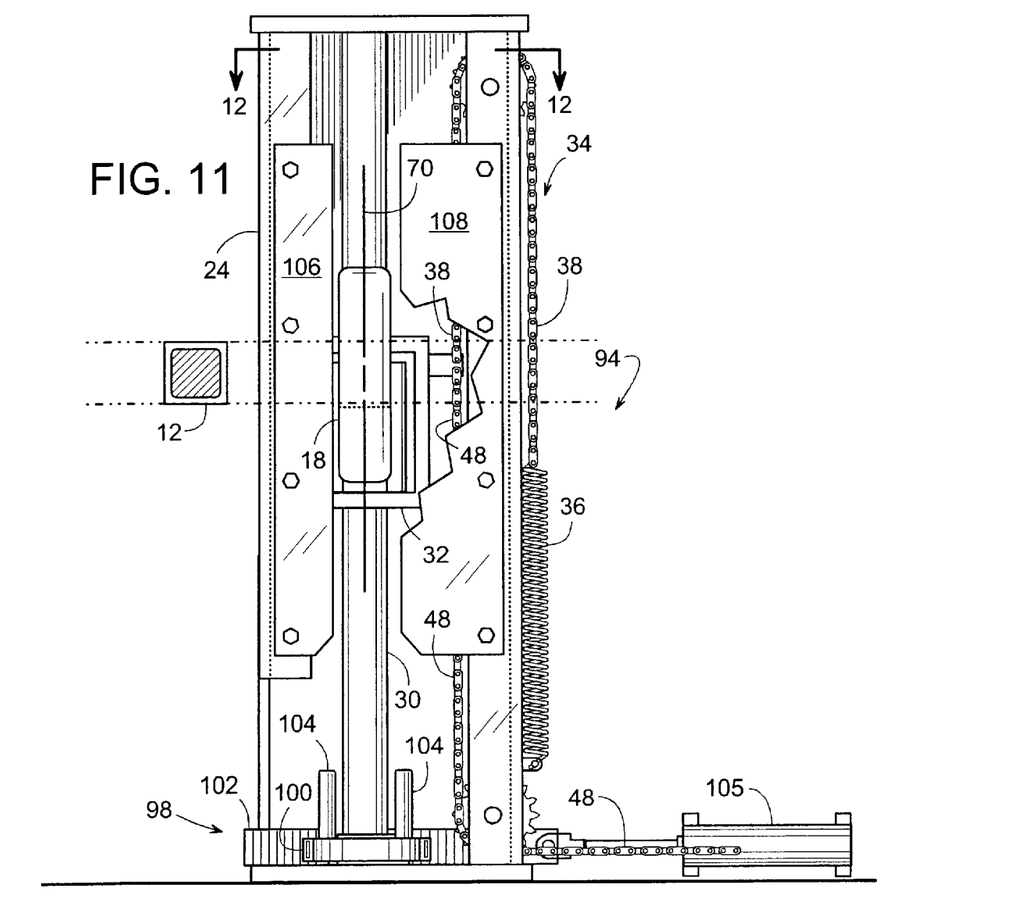
FIG. 11 is the same as FIG. 9, but with the restraint's restraining member in its raised operative position.
Figure 12:
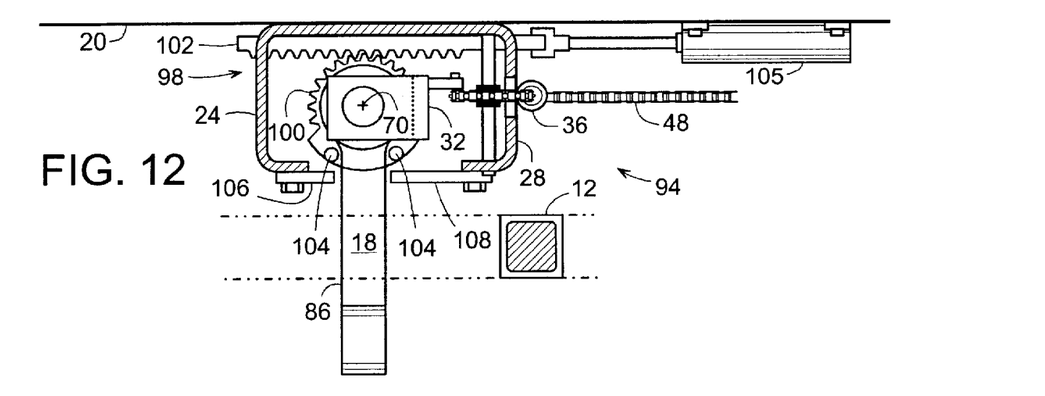
FIG. 12 is a top cross-sectional view taken along line 12—12 of FIG. 11.
Figure 13:
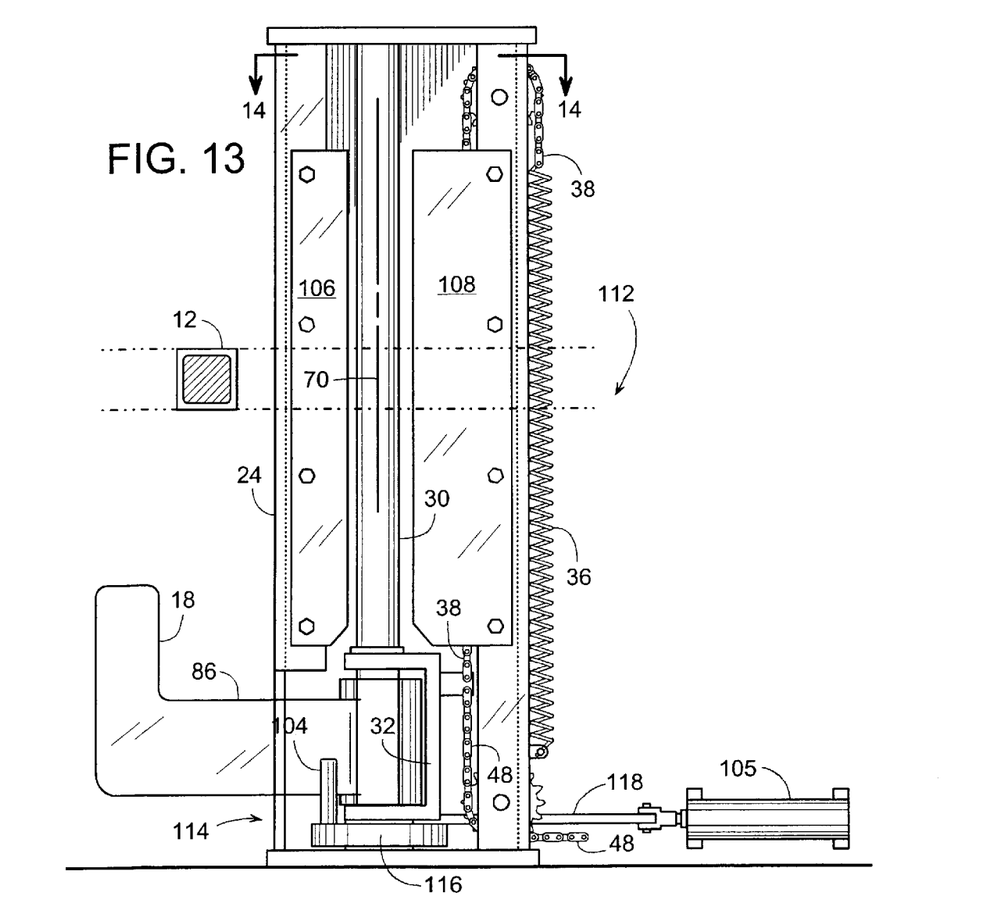
FIG. 13 is a front view of another vehicle restraint in its lowered stored position.
Figure 14:
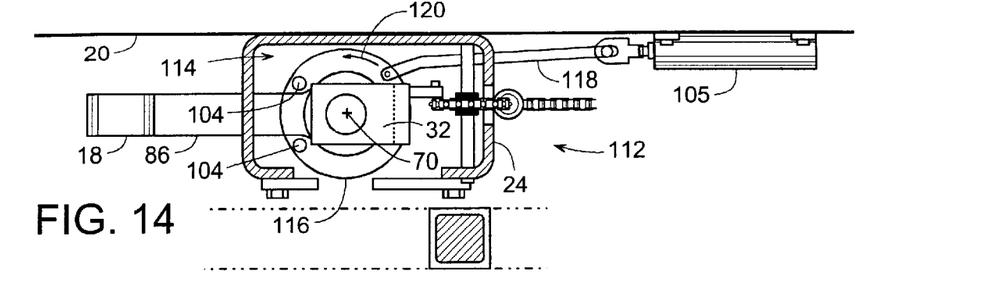
FIG. 14 is a top cross-sectional view taken along line 14—14 of FIG. 13.
Figure 15:
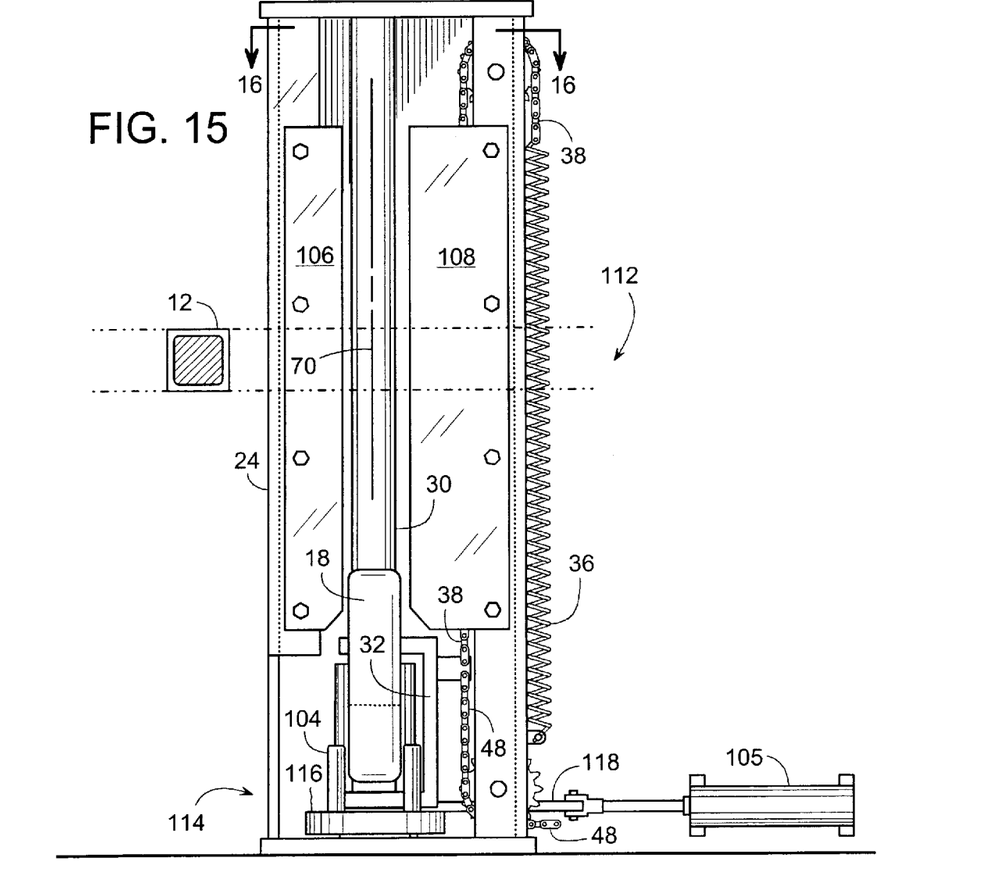
FIG. 15 is the same as FIG. 13, but with the restraint's restraining member rotated outward away from the dock face.
Figure 16:
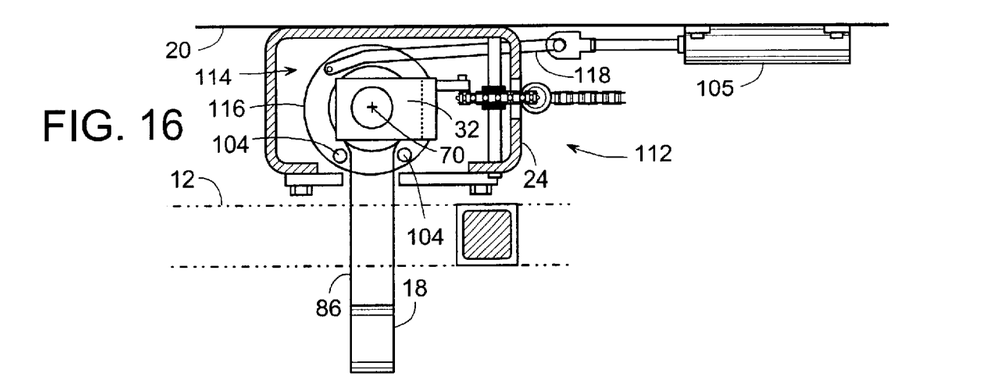
FIG. 16 is a top cross-sectional view taken along line 16—16 of FIG. 15.
Figure 17:
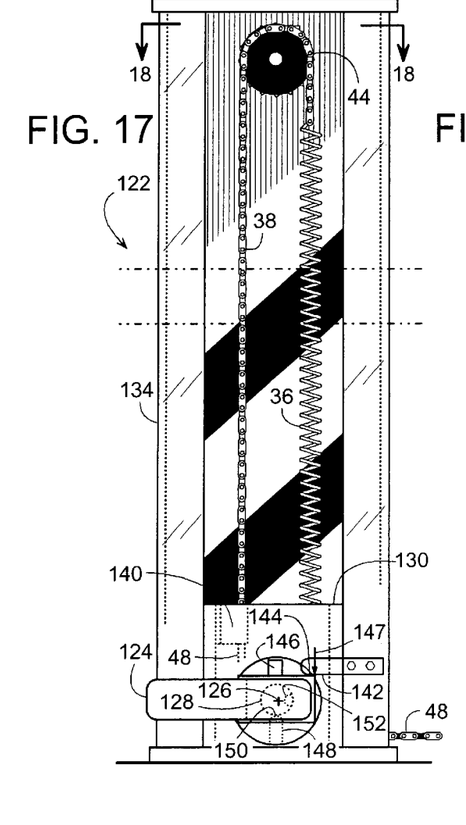
FIG. 17 is a front view of another vehicle restraint in its lowered stored position.
Figure 18:
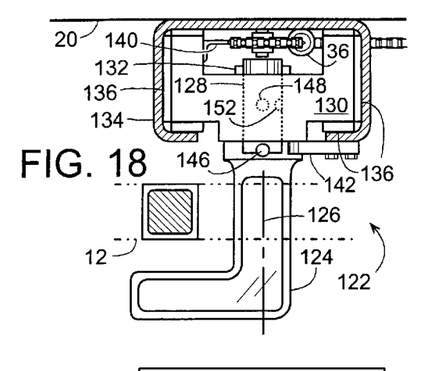
FIG. 18 is a top cross-sectional view taken along line 18—18 of FIG. 17.
Figure 19:
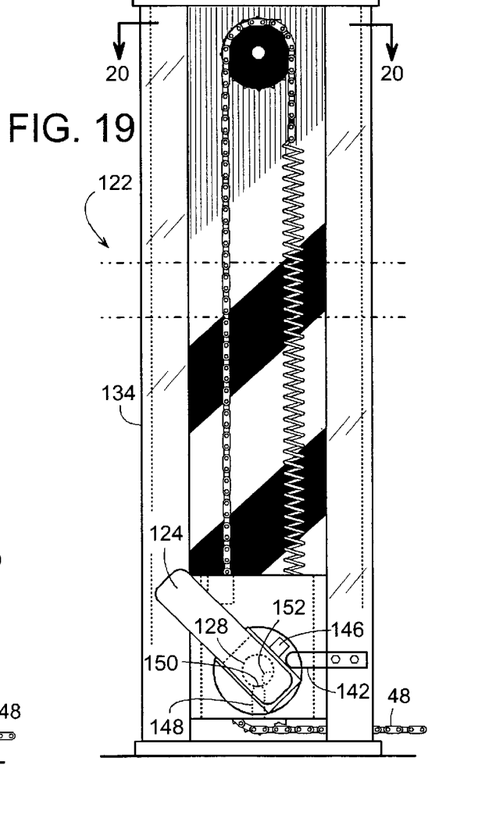
FIG. 19 is the same as FIG. 17, but with the restraint's restraining member rotated partially away from its stored position.
Figure 20:
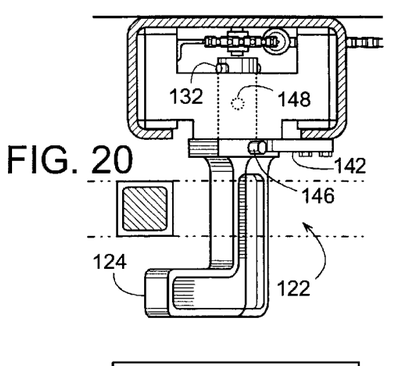
FIG. 20 is a top cross-sectional view taken along line 20—20 of FIG. 19.

In another embodiment, shown in FIGS. 7–12, a vehicle restraint 94 is able to engage a relatively low ICC bar 12, as restraining member 18 requires no vertical lift to rotate from its stored position of FIGS. 7 and 8 to its extended position of FIGS. 9 and 10. This is accomplished by an actuator 98 that rotates member 18 before member 18 ascends to its raised operative position. Actuator 98, in this example, includes a toothed element, such as a full or partial gear 100, meshing with another toothed element, such as a gear rack 102. A cylinder 105, or some other actuator (e.g., a linear actuator, solenoid, etc.), drives gear rack 102 to rotate gear 100 about vertical axis 70. Gear 100 includes one or two upwardly protruding pins 104 that engage, in this example, the sides of restraining member 18. So rack 102 rotating gear 100 causes pins 104 to rotate restraining member 18. After restraining member 18 rotates to its extended position of FIGS. 9 and 10, drive unit 34 lifts sleeve 32 off gear 100 and continues to control the vertical movement of member 18 in a manner similar to that of vehicle restraint 10. However, shank 86 slides between lateral plates 106 and 108 to help keep restraining member 18 generally perpendicular to dock face 20 when member 18 is not in its lowered stored position.

To ensure smooth rotational operation of restraining member 18, rack 102 exerts a force 110 substantially perpendicular to axis 70 and at a generally uniform offset distance from the axis. Further, it should be appreciated by those skilled in the art, that pins 104 engaging the sides of shank 86 is just one exemplary disconnectable coupling that allows restraining member 18 to lift and separate from rotational actuator 98. Other examples of a disconnectable coupling include, but are not limited to a single pin on gear 100 protruding upward into a hole in the bottom of shank 86 (or protruding into a ring attached thereto), or a single pin on shank 86 protruding downward into a hole in gear 100.

FIGS. 13–16 shows a vehicle restraint 112 similar to restraint 94; however, a rotational actuator 114 includes a linkage assembly comprising a rotational link 116 pinned to an actuator link 118. Links 116 and 118 replace gear 100 and rack 102 respectively. Similar to restraint 94, cylinder 105 moving link 118 provides a force that rotates link 116 about vertical axis 70. Link 116 exerts a force 120 substantially perpendicular to axis 70 and at a generally uniform offset distance from the axis to ensure smooth, even rotation of restraining member 18. With upwardly protruding pins 104 engaging the sides of shank 86, the rotation of link 116 rotates restraining member 18 from its stored position of FIGS. 13 and 14 to its outwardly extended position of FIGS. 15 and 16. Once restraining member 18 is in its extended position of FIGS. 15 and 16, vertical movement of member 18 is controlled in the same manner as in restraints 10 and 94.

In order to engage an especially low ICC bar or clear vehicles with low ground clearance, a vehicle restraint 122, of FIGS. 17–23, includes a restraining member 124 that rotates about an axis 126 that is preferably perpendicular to dock face 20 or at least traverses it. A line or axis traversing a plane or a dock face means that the line or axis intersects the plane rather than lying along the plane or being parallel to it. Axis 126 traversing dock face 20 provides restraining member 124 with a lowered stored position (FIGS. 17 and 18) that is appreciable lower than that of the other embodiments. To provide the rotation, restraining member 124 includes an integral shaft 128 that is rotatably disposed within a carriage 130 and restrained axially by way of a pin 132 or some other type of fastener.

Vertical movement of restraining member 124 is provided by carriage 130 being able to move vertically along a track 134. Bearing pads 136 or rollers minimize the friction between carriage 130 and track 134. For upward movement, spring 36 is fixed relative to track 134 at point 138 (FIG. 23), sprocket 44 is rotatably mounted at the upper portion of track 134, and one end of chain 38 is connected to spring 36 while an opposite end is connected to a lug 140 extending from carriage 130. In such a configuration, chain 38, sprocket 44 and spring 36 operate to urge carriage 130 upward (and restraining member 124 with it) in nearly the same manner as in the other embodiments already described. For downward movement or to limit the extent to which carriage 130 may rise, one end of chain 48 connects to lug 140 while the rest of chain 48 extends around sprocket 52 (FIG. 23) to connect to the remainder of drive unit 34, as already described with reference to other embodiments. In other words, spring 36 urges carriage 130 up, and powered take-up device 50 (FIG. 2) of drive unit 34 pulls it down.

Just as with vehicle restraint 10, the vertical movement of restraining member 124 also causes its rotation. Carriage 130 lifting restraining member 124 causes member 124 to rotate from its stored position of FIGS. 17 and 18, through a partially turned rotation of FIGS. 19 and 20, and onto its upright position of FIGS. 21 and 22. Carriage 130 lowering restraining member 124 back down causes member 124 to rotate back to its stored position. This is accomplished by a stationary protrusion 142 interacting with restraining member 124.

In one embodiment, for example, protrusion 142 is fixed relative to track 134 (e.g., protrusion 142 is fastened to or is an integral feature of track 134) and alternately engages a heel 144 and a pin 146 of restraining member 124. As carriage 130 starts lifting restraining member 124 from its stored position, heel 144 abutting protrusion 142 creates a force 147 that rotates member 124 clockwise as viewed in FIG. 19. To ensure smooth operation, the force 147 that protrusion 142 exerts on heel 144 is perpendicular to axis 126 and is applied at a generally constant offset distance from it.

Figure 21:
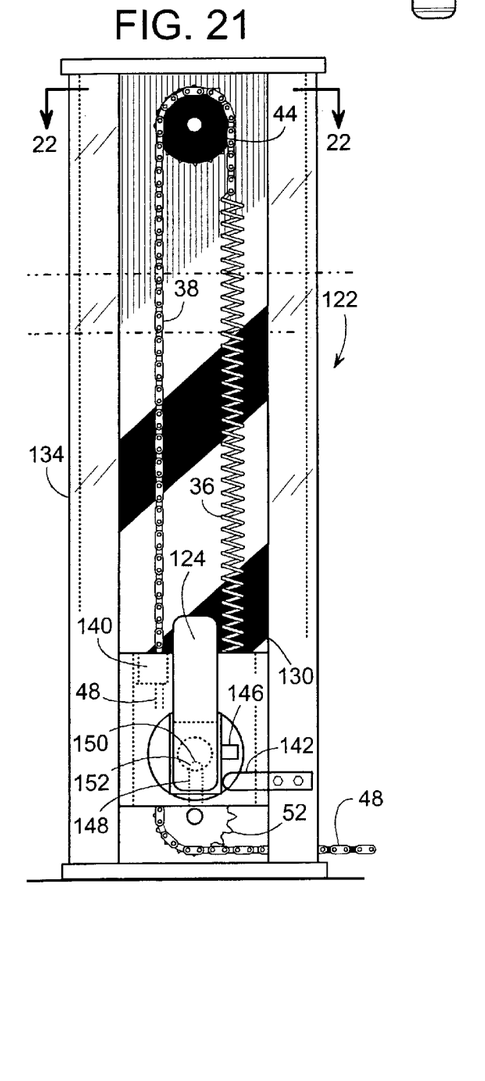
FIG. 21 is the same as FIG. 17, but with the restraint's restraining member rotated to an upright position.
Figure 22:
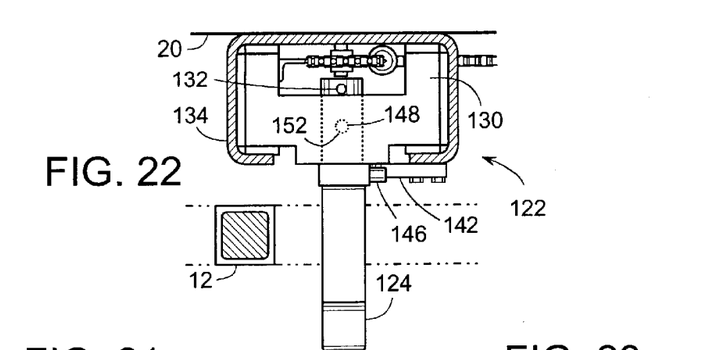
FIG. 22 is a top cross-sectional view taken along line 22—22 of FIG. 21.
Figure 23:
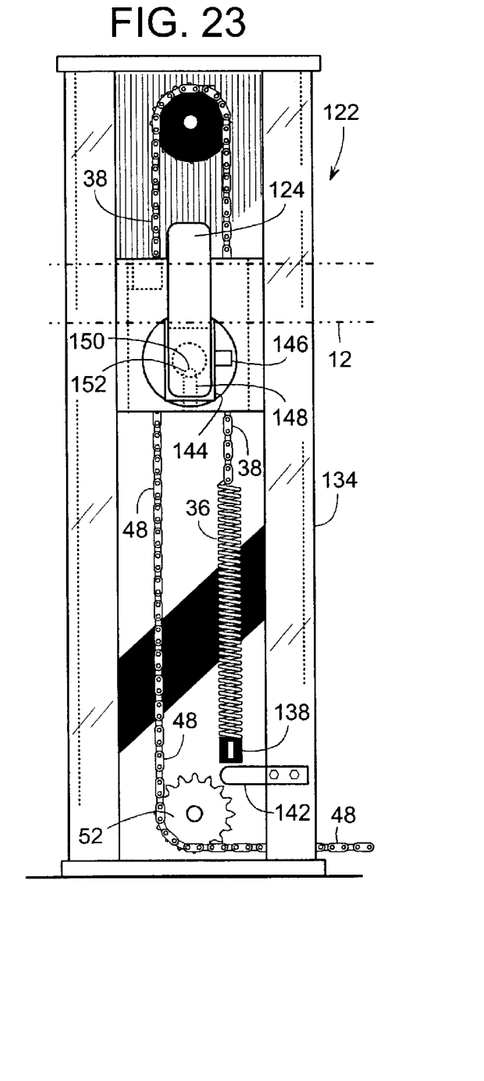
FIG. 23 is the same as FIG. 21, but with the restraint's restraining member in its raised operative position.

Once restraining member 124 rotates to its upright position of FIG. 21, drive unit 34 can lift it further to restrain ICC bar 12, as shown in FIG. 23. Lowering carriage 130 and restraining member 124 releases bar 12. Further lowering of member 124 below its position of FIG. 21 causes pin 146 to abut protrusion 142. This creates a contact force (generally opposite to force 147) that protrusion 142 exerts against pin 146 to rotate restraining member 124 counterclockwise until member 124 returns to its stored position of FIGS. 17 and 18.

When restraining member 124 rotates to its upright position of FIG. 21, it tends to stay upright by way of a detent mechanism. In some embodiments, the detent is provided by a ball plunger 148 screwed into carriage 130. As shaft 128 rotates within carriage 130, spring-loaded tip 150 of ball plunger 148 alternately protrudes into a recess 152 on shaft 128 or presses against the outer diameter of shaft 128. When restraining member 124 rotates to its upright position (FIGS. 21–23), its integral shaft 128 rotates with it. This moves recess 152 around (with relative sliding or rolling of tip 150 along the outer diameter of shaft 128) until spring-loaded tip 150 protrudes into recess 152. Tip 150 pressing into recess 152 provides a holding force sufficient to hold member 124 upright as member 124 moves vertically between its positions of FIGS. 21 and 23. However, the forces that protrusion 142 exerts on heel 144 and pin 146 are able to overcome the holding force of plunger 148, so that restraining member 124 can still rotate between its stored and upright positions.

Although the invention is described with reference to a preferred embodiment, it should be appreciated by those skilled in the art that various modifications are well within the scope of the invention. Therefore, the scope of the invention is to be determined by reference to the claims that follow.

We claim:

1. A vehicle restraint adapted to be mounted in front of a dock face where the vehicle restraint is adapted to selectively restrain and release a vehicle, comprising:

a restraining member adapted to be mounted in front of the dock face, being moveable between a raised position to limit movement of the vehicle and a lowered position to release the vehicle, and also being rotatable about an axis between a stored orientation and an operative orientation, wherein the axis traverses a horizontal plane;

an actuator adapted to exert a force at a substantially constant radius from the axis to rotate the restraining member between the stored orientation and the operative orientation;

a rod along which the restraining member travels to move between the lowered position and the raised position and about which the restraining member rotates between the stored orientation and the operative orientation; and a first guide element associated with the rod and engaging a second guide element associated with the restraining member, wherein the first guide element engages the second guide element to rotate the restraining member as the restraining member travels vertically along the rod.

2. The vehicle restraint of claim 1, wherein the first guide element is a slot in the rod and the second guide element is a protrusion on the restraining member.

3. The vehicle restraint of claim 2, wherein the protrusion is a spring loaded plunger.

4. The vehicle restraint of claim 1, further comprising a track adapted to be fixed relative to the dock face; and a crossbar moveable relative to the track and the restraining member and engaging the track and the restraining member to inhibit the restraining member from being pulled away from the track.

5. The vehicle restraint of claim 1, wherein the actuator is a gear.

6. The vehicle restraint of claim 1, further comprising a resilient member urging the restraining member to the raised position.

7. The vehicle restraint of claim 6, further comprising a drive unit adapted to overcome the resilient member and force the restraining member to the lowered position.

8. A vehicle restraint adapted to be mounted in front of a dock face where the vehicle restraint is adapted to selectively restrain and release a vehicle, comprising:
   a restraining member adapted to be mounted in front of the dock face, being moveable between a raised position to limit movement of the vehicle and a lowered position to release the vehicle, and also being rotatable about an axis between a stored orientation and an operative orientation;
   an actuator adapted to rotate the restraining member from its stored orientation to its operative orientation while the restraining member is below the raised position;
   a rod along which the restraining member travels to move between the lowered position and the raised position and about which the restraining member rotates between the stored orientation and the operative orientation; and
   a first guide element associated with the rod and engaging a second guide element associated with the restraining member, wherein the first guide element engages the second guide element to rotate the restraining member as the restraining member travels vertically along the rod.

9. The vehicle restraint of claim 8, wherein the first guide element is a slot in the rod and the second guide element is a protrusion on the restraining member.

10. The vehicle restraint of claim 9, wherein the protrusion is a spring loaded plunger.

11. The vehicle restraint of claim 9, further comprising a track adapted to be fixed relative to the dock face; and a crossbar moveable relative to the track and the restraining member and engaging the track and the restraining member to inhibit the restrain in member from being pulled away from the track.

12. The vehicle restraint of claim 8, wherein the actuator is a gear.

13. The vehicle restraint of claim 8, further comprising a resilient member urging the restraining member to the raised position.

14. The vehicle restraint of claim 13, further comprising a drive unit adapted to overcome the resilient member and force the restraining member to the lowered position.

15. The vehicle restraint of claim 8, wherein the axis traverses a horizontal plane.

16. A vehicle restraint adapted to be mounted in front of a dock face where the vehicle restraint is adapted to selectively restrain and release a vehicle, comprising:
   a restraining member adapted to be mounted in front of the dock face, being moveable between a raised position to limit movement of the vehicle and a lowered position to release the vehicle, and also being rotatable about an axis between a stored orientation and an operative orientation;
   a powered actuator being adapted to rotate the restraining member from its stored orientation to its operative orientation before the restraining member begins moving from its lowered position to its raised position;
   a track adapted to be fixed relative to the dock face; and
   a crossbar moveable relative to the track and the restraining member and engaging the track and the restraining member to inhibit the restraining member from being pulled away from the track.

17. A method of operating a vehicle restraint adjacent a dock face, wherein the vehicle restraint includes a restraining member moveable between a raised position to limit movement of a vehicle and a lowered position to release the vehicle, and being further rotatable between a stored orientation and an operative orientation, the method comprising the steps of:
   while the restraining member is in the lowered position, initiating a powered actuator to rotate the restraining member about an axis that traverses a vertical plane, whereby the restraining member rotates from the stored orientation to the operative orientation; and
   subsequently raising the restraining member from the lowered position to the raised position.

18. The method of claim 17, wherein the axis is substantially horizontal.

* * * * *

UNITED STATES PATENT AND TRADEMARK OFFICE
CERTIFICATE OF CORRECTION

PATENT NO.    : 6,726,432 B2
DATED         : April 27, 2004
INVENTOR(S)   : John A. Kish et al.

It is certified that error appears in the above-identified patent and that said Letters Patent is hereby corrected as shown below:

Column 10,
Line 5, please delete "restrain in" and insert -- restraining --.

Signed and Sealed this

Tenth Day of August, 2004

JON W. DUDAS
*Acting Director of the United States Patent and Trademark Office*